United States Patent Office 2,999,531
Patented Sept. 12, 1961

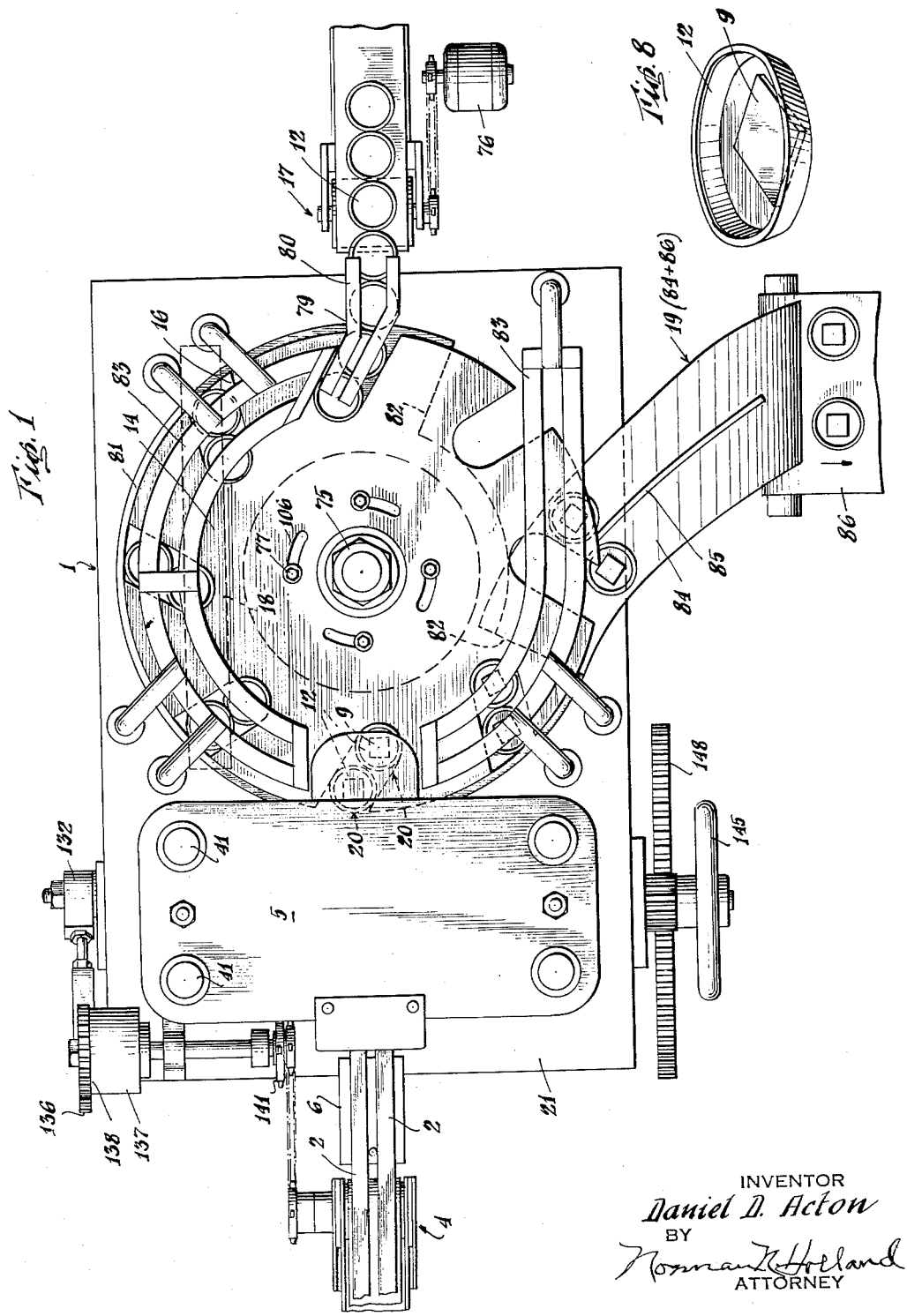

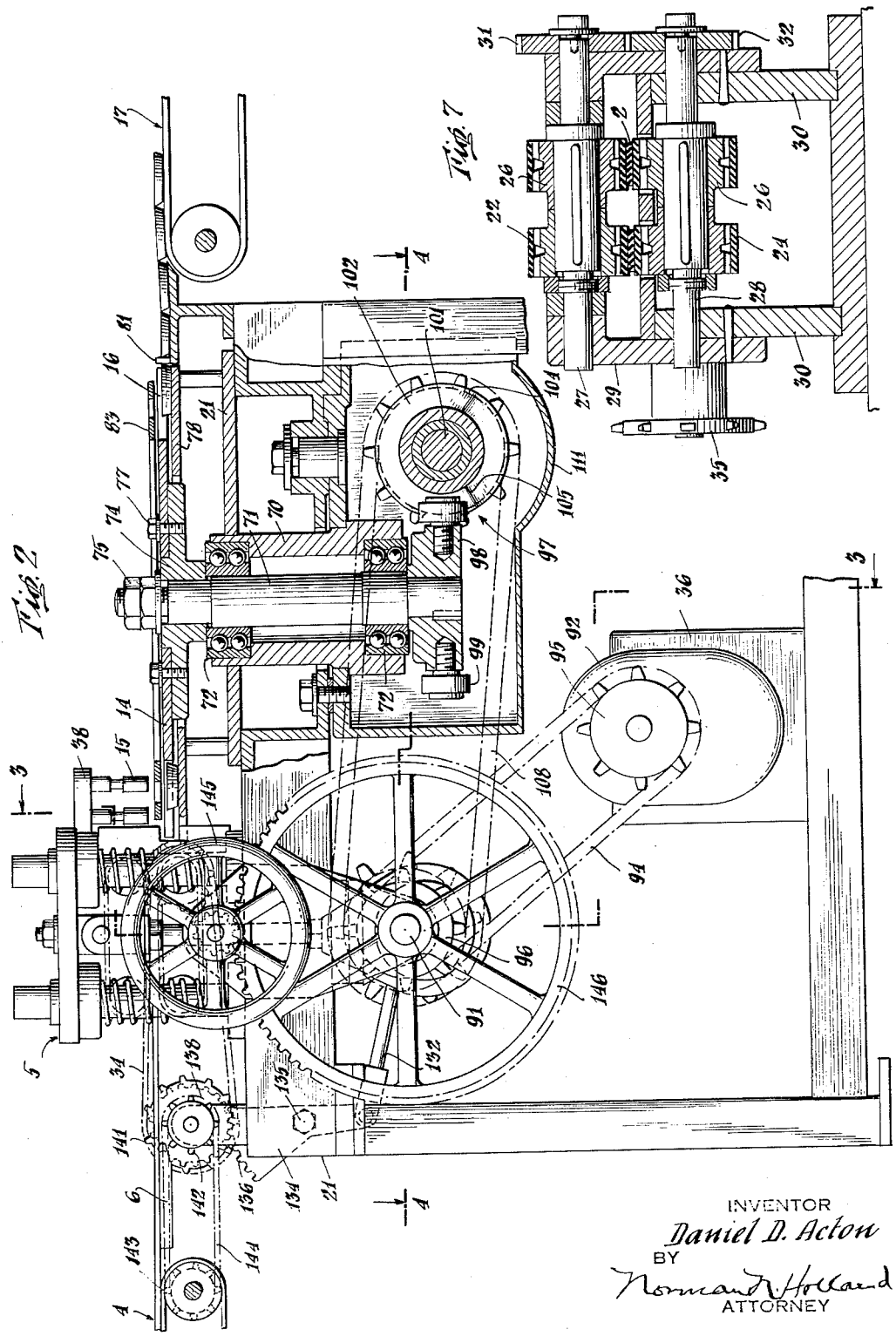

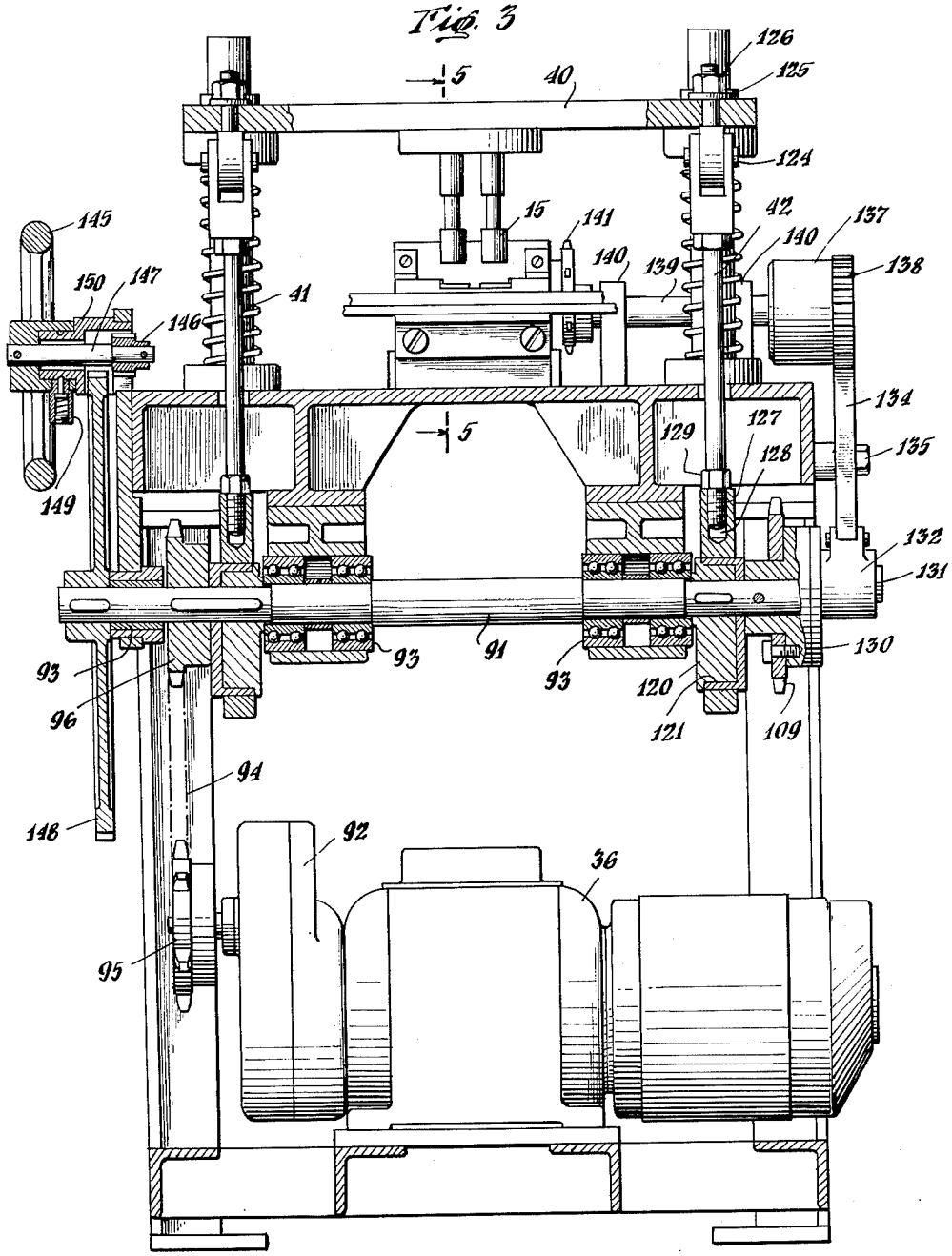

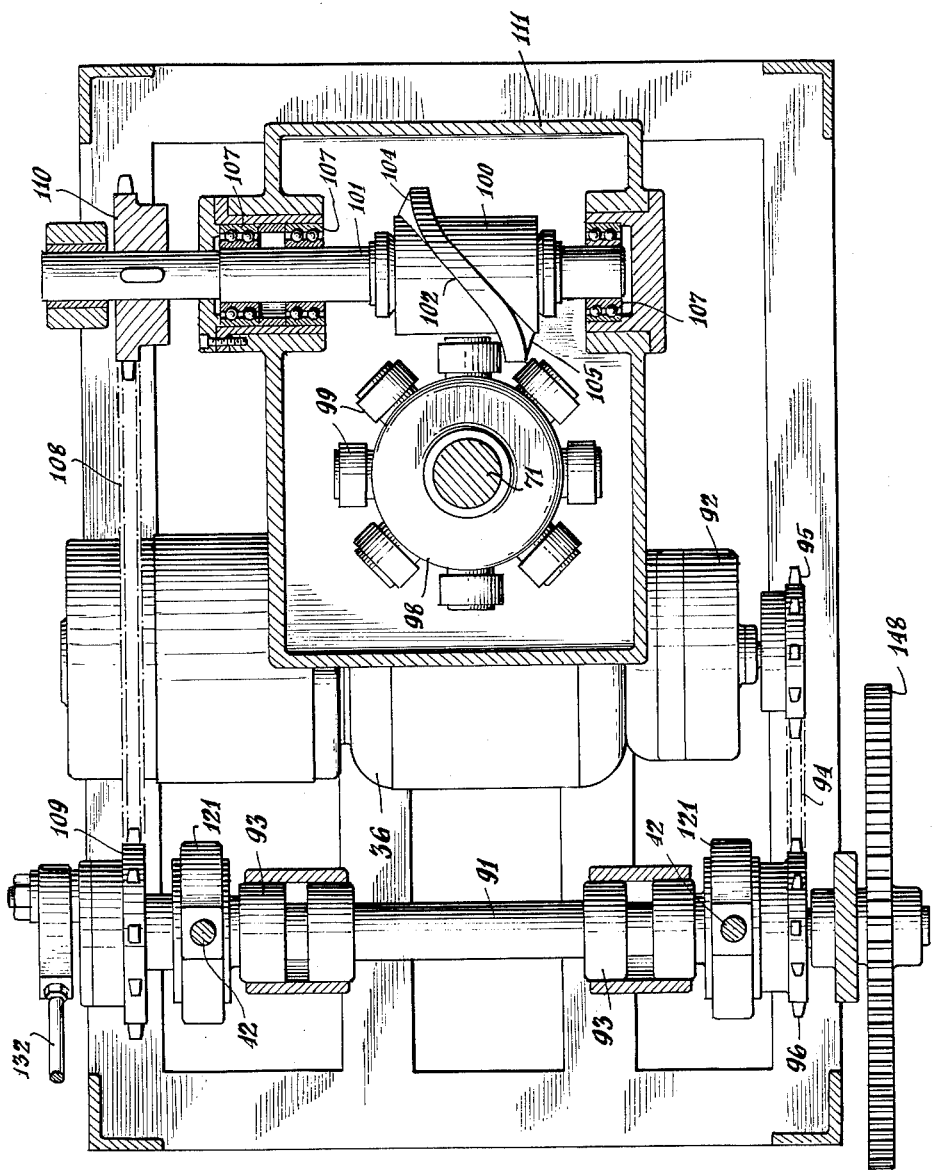

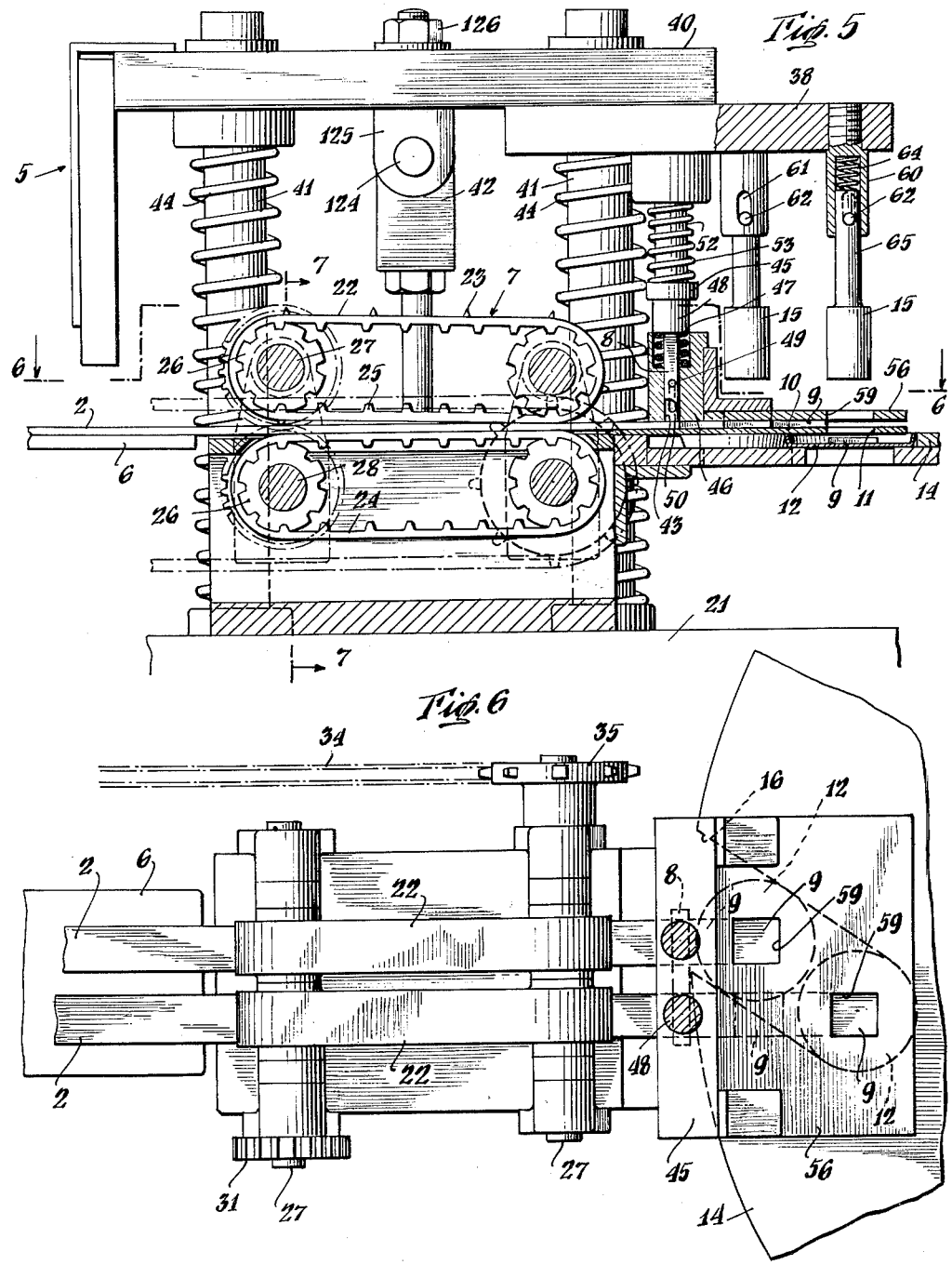

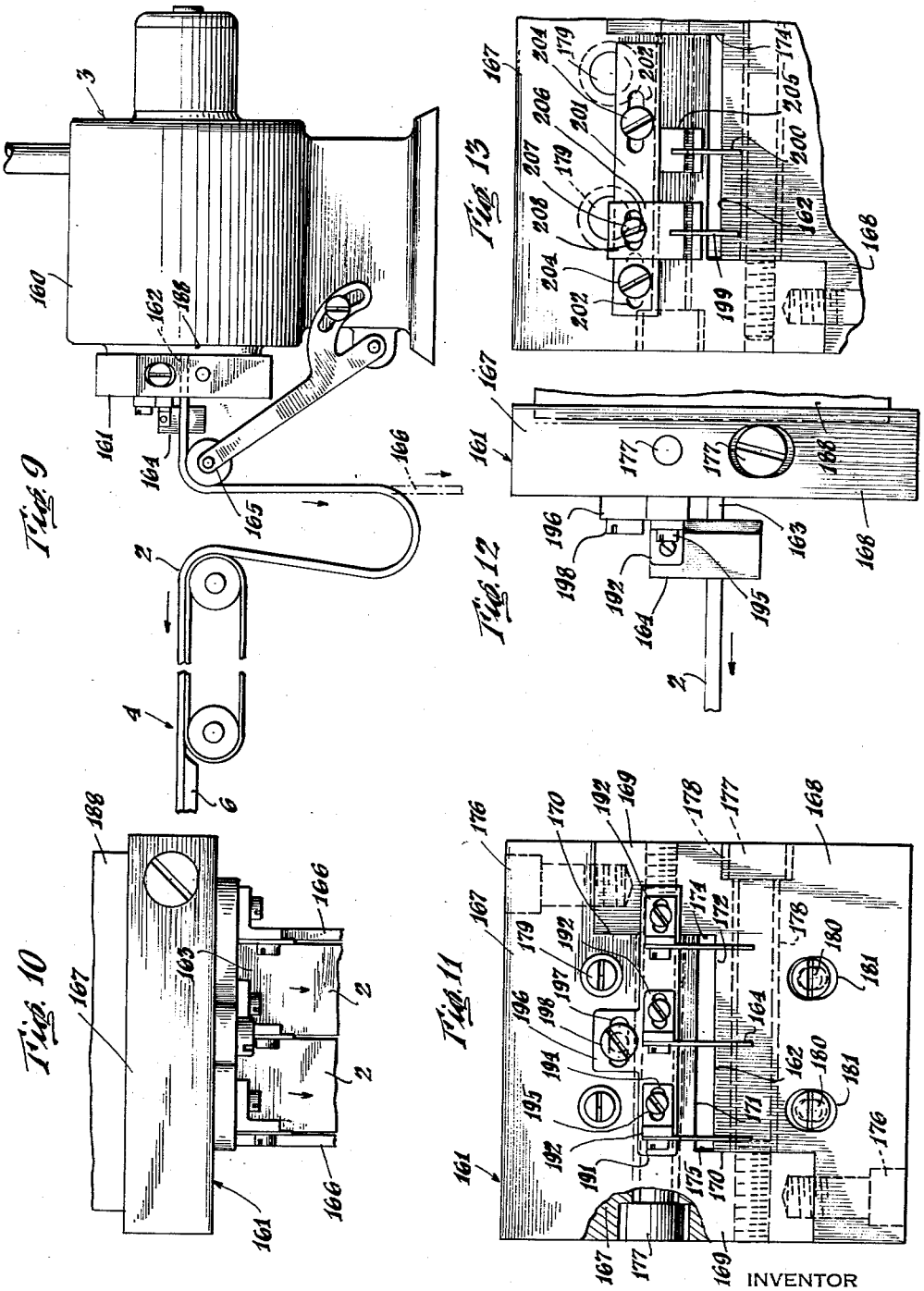

2,999,531
METHOD AND MEANS FOR FORMING AND INSERTING GASKET BLANKS IN CLOSURES
Daniel D. Acton, Lancaster, Ohio, assignor to Anchor Hocking Glass Corporation, Lancaster, Ohio, a corporation of Delaware
Filed Nov. 4, 1955, Ser. No. 545,051
3 Claims. (Cl. 154—1.5)

This invention relates to the manufacture of closures for containers and more particularly to a method of and means for forming and inserting a gasket blank of a predetermined size into a closure to prepare it for a subsequent molding operation in which the blank is molded within the closure to form a gasket such as that disclosed in the Harry E. Stover application for patent Serial No. 397,878, filed December 14, 1953, now Patent No. 2,772,013, issued November 27, 1956.

Machines for manufacturing closure caps by molding a gasket within a cup-shaped closure blank are known. Likewise, machines for stamping discs from cardboard strips and inserting them in closures are known.

The present improved machine and method forms strips of gasket material from a rubber or rubber-like synthetic composition of accurate width and thickness. The strips go directly from the extruder to an improved machine and method of severing blanks from the strips and inserting them in closure blanks for subsequent molding operations. The operation is high speed, continuous, simple and inexpensive. Since closure caps are required in large quantities in the packaging of perishable foods and other products, closure manufacturing machinery must be capable of working at high speeds with great accuracy, reliability, and efficiency to supply the closures in the quantities and at the times required.

Accordingly, an object of the present invention is to provide an improved method and means for forming gasket blanks and inserting them into closures.

Another object of the present invention is to provide an efficient and high-speed closure blank insertion device which eliminates the wastage of gasket material.

Another object of the present invention to to provide an improved gasket blank insertion device which applies a gasket blank to the closure with a controlled and predetermined position and pressure.

Another object of the present invention is to provide an improved method and means for applying a shaped and sized piece of gasket material to a cup-shaped article.

Another object of the present invention is to provide an improved gasket material extrusion device.

Other and further objects of the invention will be obvious upon an understanding of the illustrative embodiment about to be described, or will be indicated in the appended claims, and various advantages not referred to herein will occur to one skilled in the art upon employment of the invention in practice.

FIG. 1 is a top plan view of a preferred embodiment of the gasket insertion apparatus of the invention;

FIG. 2 is a side elevational view partially in section of the apparatus of FIG. 1;

FIG. 3 is a sectional view taken along the line 3—3 of FIG. 2;

FIG. 4 is a sectional view taken along the line 4—4 of FIG. 2;

FIG. 5 is a sectional view taken along the line 5—5 of FIG. 3;

FIG. 6 is a sectional view taken along the line 6—6 of FIG. 5;

FIG. 7 is a sectional view taken along the line 7—7 of FIG. 5;

FIG. 8 is a perspective view of a closure as it leaves the gasket blank insertion machine with a gasket blank in place;

FIG. 9 is a side elevational view of the gasket strip extrusion apparatus of the invention;

FIG. 10 is an enlarged top plan view of the adjustable extruder head;

FIG. 11 is a front elevational view of the adjustable extruder head of FIG. 10;

FIG. 12 is a side elevational view of the adjustable extruder head of FIG. 10; and FIG. 13 is a front elevational view partially cut away of another embodiment of the adjustable extruder head.

A general description of the device will first be given, followed by a detailed description of the principal components.

GENERAL DESCRIPTION

FIG. 1 is a top plan view of a preferred form of the gasket blank insertion apparatus 1 which cuts the gasket blanks from strips of gasket material and which inserts the blanks into closures. Two strips of gasket material 2 are shown being supplied at the left side of the gasket insertion apparatus 1 by a conveyor or other supply means 4. The strips of gasket material 2 are preferably formed by the extruder apparatus 3 of FIG. 9. This extruder apparatus forms the strips of gasket material 2 at the rate required by the gasket blank insertion apparatus 1 preferably in the exact width and thickness required. The combination of the extruder apparatus 3 and the gasket blank insertion apparatus 1 comprises an improved gasket blank formation and insertion means which forms a gasket blank of the correct thickness and shape from a batch gasket material and which inserts the gasket blank correctly positioned in a closure.

The strips of gasket material 2 formed by extruder apparatus 3 pass to conveyor 4 and thence into a gasket blank cutting and insertion means indicated generally at 5 on the left side of FIG. 1. A plate 6 formed of Teflon or other material on which gasket material such as rubber freely slides is provided to support the strips of gasket material 2 between the conveyor 4 and the gasket blank cutting and insertion means 5. The gasket blank cutting and insertion means 5 is shown in detail in FIG. 5. A gasket strip advancing means or gripper 7 intermittently moves the ends of the strips of gasket material 2 beneath a cutter blade 8 which periodically cuts through the strips of gasket material 2 to cut a gasket blank 9 from the ends thereof when the strips of gasket material 2 are stationary. After the blank 9 has been cut from the ends of the strips of gasket material 2 by the cutter blade 8, the succeeding intermittent motions of the strips of gasket material 2 push the blanks 9 onto a die plate 10 having apertures 11 through which the blanks 9 are forced into closures 12 which are positioned beneath the apertures 11 by a feed star wheel 14 (FIG. 1). The blanks 9 are forced through the apertures 11 into the closures 12 by pressing tools 15 reciprocally mounted above the apertures 11 which move downwardly against the gasket blank 9 to press them tightly against the closure 12.

The feed star wheel 14, which supplies closures 12 beneath the die plate apertures 11 at the correct time to receive blanks 9, is shown in FIG. 1. The feed star wheel 14 has slots 16 which receive the closures 12 from a closure feed means or conveyor 17 and which carry the closures 12 beneath the die plate apertures 11 as the feed star wheel 14 is rotated by a drive means synchronized with the movement of the gasket cutting and insertion means 5. A heater 18 is located beneath the feed star wheel 14 so that a lacquer coating on the inside of the closures 12 is made slightly tacky as the closures 12 are moved above the heater 18 to cause the gasket blanks 9 to adhere to the closure when they are forced thereagainst by the pressing tools 15. After the gasket blanks 9 have been pressed tightly in place by pressing tool 15, the closures 12 are carried by feed star wheel 14 to the closure removal means 19.

*Extruder apparatus*

The extruder apparatus 3 of FIG. 9 supplies strips of gasket material, such as the strips 2, to the gasket blank insertion apparatus 1 of FIG. 1. The strips of gasket material are supplied to the gasket blank insertion apparatus 1 with a predetermined thickness and preferably with a predetermined width for use with the preferred embodiment of the gasket blank insertion apparatus 1 in which the gasket blanks are square slugs whose width equals the width of the strips of gasket material 2 and which are formed by cutting predetermined lengths of the gasket material from the ends of the strips 2.

The extruder apparatus 3 comprises an extrusion chamber 160 which accommodates a charge or batch of the rubber or other suitable plastic material to be used for the gaskets and which extrudes a strip of the charge through an extruder head 161. Extrusion chambers 160 are well known and they contain a worm or other suitable device to force the charge of plastic through an extruder head attached at nozzle 188 such as the novel extruder head 161 shown in detail in FIGS. 10 to 12.

The extruder head 161 has an adjustable aperture 162 at its central portion through which the plastic material is forced so that it is formed into a narrow strip or ribbon 163. The ribbon 163 is cut longitudinally into strips 2 of the desired width by knives 164 and the strips 2 pass over a suitable idler roller 165 to conveyor 4 which carries the strips of gasket material 2 to the gasket blank insertion means 1 of FIG. 1.

Narrow edge strips 166 which are cut from the outer edges of the ribbon 163 are led to a suitable collector beneath idler roller 165.

The novel extruder head 161 of the present invention is shown in detail in FIGS. 10 to 12. The extruder head 161 has an extruder plate divided into two interlocking segments 167 and 168. Each segment has a projecting guide piece 169 on one corner which slides into a cutout 170 on an opposite corner of the other segment to provide a sliding interlock between segment 167 and segment 168. Adjacent edges of the two segments between the projecting guide piece 169 and the cutout 170 form the longer edges 171 and 172 of aperture 162. Portions of the projecting guide pieces 169 form the side edges 174 and 175 of aperture 162.

The segments 167 and 168 of the extruder head 161 are held together by adjuster bolts 176 which are turned to slide the segments toward or away from each other to vary the distance between the aperture edges 171 and 172, thereby varying the width of the extruded ribbon 163. Locking bolts 177, which are run at right angles to adjuster bolts 176, have elongated slots 178 so that they may be loosened to allow the segments 167 and 168 to slide during the adjustment of the width of the aperture 162 by adjuster bolts 176. Bolts 179 fasten the segment 167 to the extruder nozzle 188 and bolts 180 fasten segment 168 to the extruder nozzle 188. Elongated slots 181 are provided for bolts 180 to allow the segment 168 to slide with respect to bolts 180 and segment 167 when the width of aperture 162 is adjusted.

In the embodiment shown in FIGS. 9 to 12, the ribbon 163 of the plastic material is being cut into two strips 2. Three knives 164 are mounted on the face of the extruder head 161 to form the two strips 2, one knife 164 being used to cut the ribbon 163 at its center and two outer knives 164 being used to trim the outer edges of the ribbon 163 so that the strips 2 will have an exactly predetermined width. The knives 164 are fastened by screws 191 to knife mounts 192. The knife mounts 192 are adjustably mounted by slots 194 and screws 195 to a knife mounting bracket 196. The knife mounting bracket is adjustably mounted on the extruder head 161 by slot 197 and screw 198. The three knives 164 may thus be simultaneously adjusted with respect to aperture 162 by the adjustment of the knife mounting bracket 196, or each of the individual knives 164 may be separately adjusted by adjustment of its mount 192.

Once the extruder head 161 has been fastened to the nozzle 188, adjustments of the thickness of the strips 2 as well as their width may be made without again removing the head 161 from the nozzle 188. Thus, to adjust the thickness of strip 2 bolts 179 holding the extruder head 161 to nozzle 188 remain tight. Bolts 180 and 177 are loosened to allow them to move relative to slots 181 and 178, respectively. Adjuster bolts 176 are now turned to move the extruder head segment 168 to the correct position to provide the desired width of aperture 162. Bolts 177 and 180 are now tightened to lock the extruder head segments 167 and 168 in their adjusted position.

The width of the strips 2 cut from the extruder ribbon 163 is adjusted by first positioning the center knife 164 by adjusting the knife mounting bracket 196 or the center knife mount 192. The outer knives 164 are now positioned by adjusting their mounts 192 on the knife mounting bracket 196.

FIG. 13 shows another embodiment of the extruder head with two knives 199 and 200. Knife 200 cooperates with edge 174 of slot 162 to form one strip of gasket material whose width is set by adjusting knife bracket 201 held by bolts 204 in slots 202. Another strip of gasket material is cut between knives 199 and 200 and its width is adjusted by the setting of knife bracket 206 held by bolt 208 in slot 207.

*Cutting and insertion means*

The cutting and insertion means 5 is shown in detail in FIGS. 2, 5, 6, and 7. The strips of gasket material 2 from the extruder apparatus 3 enter the cutting and insertion means 5 from a conveyor 4 and are drawn therein over a guide plate 6 by gripper 7. Gripper 7 comprises an upper and a lower gripping belt 22 and 24, respectively, for each strip of gasket material 2. The belts 22 and 24 are spaced from one another so that they cooperate to grip the strips 2 between them to move the strips 2 toward the gasket insertion position indicated at 20 (FIG. 1). Belts 22 and 24 may be of any suitable type. A silent-chain link belt with teeth 25 driven by drive sprockets 26 mounted on upper and lower sprocket shafts 27 and 28, respectively, have proven satisfactory. Cleats 23 on the contact surface of upper gripping belt 22 engage the strips 2 of gasket material to improve the gripping action of the belts 22 and 24. Shafts 27 and 28 are rotatably supported in mounting blocks 29 and 30 (FIG. 7) and the upper and lower drive shafts 27 and 28 are interconnected by gears 31 and 32.

A drive chain 34 attached to sprocket 35 on the lower drive shaft 28 connects the gripper to the main drive motor 36 through a suitable drive system to provide an intermittent motion to the gripper 7 as will be further explained below with the drive system. The gripping belts 22 and 24 of gripper 7 are periodically turned by the drive system to move the gasket material strips 2 from gripper 7 toward the cutter blade 8. Cutter blade 8 is reciprocated vertically by striker 45 mounted on a tool mounting plate 38 to cut the strips 2 into blanks 9 of a predetermined length as the strips 2 are intermittently moved forward beneath the cutter blade 8. Thus, the gripper 7 first moves the strip a predetermined distance past cutter blade 8. Cutter blade 8 is then moved downwardly by striker 45 to cut a blank 9 from the strip 2. The striker 45 is then raised, allowing spring 47 to raise cutter blade 8. The gripper 7 now moves strip 2 forward again beneath cutter blade 8, and the gasket blank 9 cut from the end of strip 2 is moved by the end of gasket strip 2 toward gasket insertion point 20 for insertion in a closure as will be explained hereafter. The tool mounting plate 38 on which the striker 45 is mounted is attached to a reciprocating plate 40 which is floatingly mounted on guide posts 41 so that it may be vertically reciprocated by drive rods 42. The drive means for drive rod 42 and its synchronization with the gripper 7 to provide the alternate cutting and advancing action on the gasket material strip 2 will be described below with the drive means. Springs 44 about guide posts 41 operate a lubricating ring.

The cutter blade 8 and the cutter blade striker 45 are shown in detail in FIGS. 5 and 6. The cutter blade 8 is slidably mounted in a slot 43 in blade holder 46. A spring 47 compressed between a contact head 48 and the blade holder 46 urges the cutter blade 8 toward its upward position and in addition compensates for wear. Pin 49 in slot 50 of the blade holder 46 fixes the upward portion of the cutter blade 8. The striker 45 is attached by a resilient mounting to the tool mounting plate 38 so that it is moved against the contact head 48 of cutter blade 8 to cause the cutter blade to sever the gasket strip 2. The resilient mounting for the striker 45 comprises a slot into which the striker shaft 52 is slidably mounted. Compressed spring 53 yields as the striker 45 strikes the cutter blade contact head 48 to prevent excess downward travel of the cutter blade 8.

After a gasket blank 9 has been cut from the strip of gasket material 2 by the cutter blade 8, subsequent movements of the gripper 7 will cause the strip 2 to move the blank 9 toward an aperture 11 in die plate 10 above a closure 12. The movements of the cutter 8 and the gripper 7 are adjusted so that each intermittent advancing motion of the gripper will move a blank 9 directly above the aperture 11 so that the blank 9 will fall through the aperture 11 into a closure 12. As seen in FIGS. 5 and 6, apertures 11 are in different positions along the path of the gasket material strips 2 so that one gasket blank 9 will be in line between the cutter blade 8 and the aperture 11 in one line and so that three gasket blanks 9 will be in line between the cutter blade 8 and the other aperture 11. The displacement of the apertures 11 allows them to position a gasket blank 9 into two adjacent closures 12 diagonally positioned in the feed star wheel 14. The gasket blanks 9 are forced into the closures 12 through an aperture 11 in a die plate 10. The aperture 11 is, preferably, slightly smaller than the gasket blank 9 so that the gasket blank 9 remains supported on the die plate 10, the blank 9 will be forced through the aperture 11 by the presser or pressing tool 15 which moves through a suitable aperture 59 in upper guide plate 56. The pressing tool 15 presses the gasket blank 9 firmly against the closure 12. As noted above, the closure 12 is heated before it reaches the gasket insertion point 20 so that a lacquer coating therein is in a tacky state. The pressing tool 15 firmly presses the gasket blank 9 into the tacky lacquer to attach it to the closure 12. The pressing tools 15 are resiliently attached to tool plate 38 by a mounting socket 60 which slidably engages the arm 65 of the pressing tool 15 and which has a slot 61 to engage a pin 62 in the pressing tool 15. Spring 64 urges the pressing tool 15 into its normal gasket striking position. The spring 64 is compressed by the downward striking action of the pressing tool 15 on the gasket blank 9. The compression force of the pressing tool 15 on the gasket blank 9 may be changed as desired by adjusting the downward travel of the reciprocating plate 40 or by changing the tension of springs 64. At the cutter 8 and the pressing tool 15 are both attached to tool mounting plate 38, they move together so that cutter 8 is cutting one blank 9 while pressing tool 15 is pressing a previously cut blank 9 into a closure 12. The preferred embodiment uses a straight cutter 8 to cut a rectangular blank 9 whose width equals the width of the strip 2 so that there is no waste gasket material. However, other shaped knives or dies may be used at the cutting or gasket insertion points to cut or blank variously shaped gasket blanks from the strips of gasket material.

The closure feed star wheel

The feed star wheel 14 which carries the closures 12 from a closure supply 17 to the gasket blank insertion point indicated at 20 and thence to closure removal means 19 is shown in FIGS. 1 and 2. The feed star wheel 14 has an intermittent motion timed so that the closures 12 will be in position at the right time beneath pressing tools 15 to accept the gasket blanks 9 and so that the closures 12 will be left motionless in this position for the correct interval. The drive and timing means for the feed star wheel will be described under the heading of "Drive System."

As seen in FIG. 2, the feed star wheel 14 is mounted on frame 21 in a mounting bracket 70 on a vertical shaft 71 rotatably held by bearings 72. The feed star wheel 14 is fastened by bolts 77 to a hub 74 which is held on shaft 71 by nuts 75. A ring-shaped support plate 78 is fixedly attached to frame 21 a slight distance below feed star wheel 14 to support the closures 12 as they are positioned and carried around support plate 78 by the slots 16 in star feed wheel 14.

The closure supply means 17 is positioned with respect to the feed star wheel 14 so that the closures being fed are moved into a slot 16 at closure loading position 79 (FIG. 1) when another slot 16 is positioned at the gasket blank insertion position indicated at 20. During the stationary period of the feed star wheel 14, while the gasket blanks 9 are being inserted at the gasket insertion position 20, two closures will be slipped into the slot 16 at the closure loading position 79. The closure supply means 17, preferably comprises a continuously running conveyor run by a suitable motor 76 so that a solid line of closures 12 are urged against the feed star wheel 14. Thus, when a slot 16 is presented at the closure loading position 79, two closures will automatically slip into place within the slot 16. When no slot is in position, the leading closures 12 will abut the edge of the feed star wheel 14 and will cause the other closures on the conveyor belt to slip on the belt surface. A guide means 80 directs the closures from the supply means 17 to the slot 16. With this type of feed, no special synchronization is required for the closure supply means 17 and it may be left in continuous motion with sufficient belt speed to assure an adequate supply of closures 12.

A guide rail 81 is mounted around the edge of the feed star wheel 14 to hold the closures 12 in slots 16 between the closure loading position 79 and the closure removal means 19. A top guide 83 is positioned above the slots 16 of the feed star wheel 14 to prevent the closure from moving out of the top of the feed star wheel 14.

After the gasket blanks 9 have been inserted at position 20, the feed star wheel 14 moves the closures to a closure discharge chute 84. A slot 82 is provided in the closure support plate 78 allowing the closures to drop from support plate 78 onto the surface of a closure chute 84 as the feed star wheels move the closures toward closure removal means 19. Closure chute 84 is sloped downwardly and away from the feed star wheel 14 so that the closures 12 slide onto a conveyor or other suitable closure carrier means 86. A divider flange 85 on chute 84 separates the inner and outer closures 12 in the slot 16 so that they are spaced on the closure carrier means 86.

Drive system

With the exception of the closure supply means 17 which, as noted above, may run at a constant speed and need not be synchronized with the other moving parts, the moving parts of the device have their motions synchronized both with regard to timing and rate of movement. The preferred drive system which provides a coordinated movement of the various moving parts is shown in detail in FIGS. 2, 3, and 4.

An electrical drive motor 36 is mounted in the base of the frame 21 to provide the motive power. Motor 36 turns a horizontal drive shaft 91 through the intermediation of a speed reducer 92 and chain 94 connecting sprocket 95 on the speed reducer 92 and sprocket 96 on the drive shaft 91. Drive shaft 91 is mounted on bearings 93 on frame 21. The feed star wheel 14, the reciprocating plate 40 with its associated cutter blade 8 and pressing tools 15, the gripper 7, and the gasket material supply means 4 are all driven from and synchronized by the continuously rotating drive shaft 91 as will now be described in detail.

The feed star wheel 14 is driven from drive shaft 91 through an intermittent drive 97 which is preferably a Ferguson drive of the well-known type. The Ferguson drive comprises a roll gear 98 having spaced rollers 99 around its outer edge. A cam 100 mounted on cam shaft 101 has a worm-like cam surface 102 partially around the cam 100 circumference so that as the cam shaft 101 revolves, the cam surface 102 contacts a roller 99 during a portion of the cam shaft revolution and during this portion the roll gear 98 turns the shaft 71 to step the feed star wheel 14 the distance between two slots 16. The cam shaft 101 is mounted on suitable bearings 107 and is driven from drive shaft 91 by chain 108 which connects between sprocket 109 on drive shaft 91 and sprocket 110 on cam shaft 101. The shaft 71 will remain stationary from the time the end 104 of cam surface 102 leaves one roller 99 until the start portion 105 contacts the next roller 99. During this stationary interval, the gasket blanks 9 are forced into closures 12 by the pressing tools 15 as described above and the closures 12 are also pushed into the slot 16 at the closure loading position 79. As seen in FIG. 1, slots 106 are provided for the connector bolts 77 between the feed star wheel 14 and the hub 74 to allow for adjustment of the slot 16 positions during the stationary period of the feed star wheel 14.

An oil tight enclosure 111 surrounds the intermittent drive mechanism 97 to allow the mechanism to be run in a lubricating oil bath. Other known types of drives may be used to convert the continuous rotation of drive shaft 91 to a stepped rotational movement of feed star wheel 14.

The reciprocating plate 40, as described above in connection with the explanation of the operation of the cutting and insertion means 5, reciprocates vertically in order to operate the cutter blade 8 and the pressing tools 15. The mounting plate 40 is operatively connected to drive shaft 91 by eccentrics 120 which are splined to drive shaft 91 and which are fitted in bearings 121 of drive rods 42. The drive rods 42 are pivotally attached by pins 124 to brackets 125 bolted to mounting plate 40 by nuts 126. Thus, as the drive shaft 91 rotates, the eccentric 120 will impart a generally vertical reciprocal motion to drive rods 42 which will in turn reciprocate mounting plate 40 on its guide posts 41. The downward position of the mounting plate 40 may be adjusted by turning the threaded portion 127 of the drive rod 42 into threaded slot 128 of bearing 121 and by then locking the drive rod 42 into position with lock nut 129. Since the mounting plate 40 is connected positively to drive shaft 91, as is also the feed star wheel 14, the motions of the two will be synchronized. The relative positions of the mounting plate 40 and the feed star wheel 14 may be set by the positioning of feed star wheel 14 drive chain 108 on sprockets 109 and 110. The final adjustments for the relative positions of the mounting plate 40 and the feed star wheel 14 are made by adjusting the slotted connection 106 between the hub 74 and the feed star wheel 14.

The gripper 7, which moves the gasket material strips 2 to the gasket plate insertion position 20, is also driven from drive shaft 91. A crank 130 is fastened to one end of drive shaft 91 having a crank pin 131 rotatably coupled to one end of a connecting rod 132. The other end of connecting rod 132 is pivotally connected to one end of a rocker arm 134 which is pivotally connected by bolt 135 to frame 21. The upper end of rocker arm 134 is provided with an arcuate gear portion 136 which engages gear 138 operatively attached to a shaft 139 through a ratchet means 137. Shaft 139 is rotatably mounted in bearings 140 so that as the rocking motion of rocker arm 134 alternately turns gear 138 in opposite directions, only the motion of gear 138 in one direction will be transmitted through ratchet means 137 to shaft 139. Thus, shaft 139 will be intermittently rotated in one direction.

The inner end of shaft 139 is connected to the sprocket 35 on gripper 7 by means of chain 34 and sprocket 141. Ratchet 137 is set so that the intermittent turning motion of shaft 139 moves the adjacent portions of gripper belts 22 and 24, which are in contact with the gasket strips 2, toward the gasket blank insertion position 20. Shaft 139 is also connected by sprockets 142 and 143 and chain 144 to turn the gasket strip supply means or conveyor 4 in synchronization with gripper 7. The distance which the gripper 7 moves the gasket material strip 2 during each of the moving intervals may be adjusted by changing the length of the stroke of the connecting rod 132. The timing of the intermittent motion may be adjusted by adjusting the position of crank 130 on drive shaft 91.

In order to provide a manual drive to allow for a slow operation of the machine during the adjusting and trial runs, a hand wheel 145 is mounted on bearing 150 above drive shaft 91. Gear 146 on the hand wheel axle 147 meshes with gear 148 on the drive shaft 91. In order to disconnect the hand wheel 145 when the machine is driven by the drive motor 36, the hand wheel axle 147 is slidably mounted on bearing 150 to allow gear 146 to be disengaged from gear 148 as is shown in FIG. 3. A resiliently mounted locking pin 149 holds the hand wheel 145 in its disengaged position.

*Operation*

To place the machine in operation, the extruder apparatus 3 is first adjusted to provide strips of gasket material 2 of the correct width and thickness. This is done by adjusting the width of slot 162 by bolts 176, with bolts 177 and 180 loosened. Bolts 177 and 180 are now tightened and the width of the strips 2 is set by adjusting the knives 164 on their adjustable mounts 196 and 192. Strips of gasket material 2 extruded from the extruder apparatus 3 are now led to the supply conveyor 4 and thence across guide plate 6 to the gripper 7. With the extruder apparatus 3 extruding strips 2 at slow speed, the hand wheel 144 may now be engaged and turned slowly to rotate drive shaft 91 and to thereby move the various portions of the machine at slow speed to check the operation and synchronization of the various parts. Simultaneously, the closure supply means 17 supplies an adequate supply of closures to the feed star wheel 14 at the closure loading position 79. As the drive shaft 91 rotates, the feed star wheel 14 will carry closures into the gasket blank insertion position 20. As the gripper advances, the gasket strip 2 moves beneath the reciprocating cutter blade 8 which cuts blanks 9 from the end of strip 2.

The gasket blanks 9 are moved toward and into closures 12 at the gasket insertion point 20 by subsequent movements of the strips 2. Reciprocating pressing tools 15 thereafter press the gasket blanks 9 against a closure 12 positioned beneath the die plate 10 to position the gasket blank 9 in the closure 12 and to cause blank 9 to adhere to the heated lacquer coating of the closures. As soon as the operation of the machine has been checked by the use of the hand wheel, the hand wheel may be disengaged and the motor 36 may be energized to bring the gasket cutting and inserting machine up to its normal operating speed. The rate of operation of extruder apparatus 3 is now set to supply gasket strip 2 at the rate required.

The closures now are moved automatically from closure supply conveyor 17 to the feed star wheel 14, which carries them into position at the gasket insertion position 20. Here the pressing tools 15 each press a gasket blank 9 out from one of the gasket strips 2 against each of the adjacent closures 12 in feed star wheel 14 slot 16. After the blank 9 is positioned in closure 12, further rotation of the feed star wheel 14 moves the closures 12 to the discharge chute 84, at which point the closures 12 slide out of feed star wheel 14 onto a suitable closure removal means 86.

It can be seen that an improved method and means has been provided to form, cut and apply gasket blanks to closures for a subsequent gasket molding operation in which the gasket blank is shaped to form a gasket of predetermined design within a hollow closure cap. The method and means are adapted to apply a gasket blank of an exactly predetermined size to a closure at high speed without any wastage of gasket material. The machine and method are also adapted for precision adjustments so that the gasket blank may be accurately positioned in the closure and may be applied to the inner surface thereof with a predetermined pressure. The operation of the device is relatively simple and it permits the synchronization and timing adjustments of the movements of the interrelated parts to be easily made and checked.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

I claim:

1. A device for inserting substantially rectangular gasket blanks into closures comprising a gasket strip forming means adapted to form a strip of predetermined width and thickness, a gasket insertion plate having a generally rectangular aperture corresponding to the shape of the gasket blank and slightly smaller than said blank, a closure positioning means adapted to present closures successively beneath said aperture, a gasket strip advancing means adapted to contact a gasket strip formed by said gasket strip forming means and positioned between said gasket strip forming means and the gasket blank insertion plate aperture and adapted to intermittently advance the gasket strip a distance equal to a gasket blank length, a straight-line cutter reciprocally mounted adjacent the path of the gasket strip between said gasket strip forming means and the said aperture, cutter drive means adapted to move said cutter during the interval between gasket strip movement to sever said gasket strip and to thereby cut a gasket blank therefrom a plurality of gasket blank lengths from the end while the gasket strip is stationary whereby subsequent advancement of said gasket strip by said advancing means moves said gasket blanks above a closure presented beneath said aperture by said closure positioning means, a gasket blank pressing tool, and a reciprocal drive means for said pressing tool to move said pressing tool against the gasket blank above the closure while the closure is at the gasket blank insertion aperture and adapted to move the gasket blank through said aperture and against the closure.

2. The method of inserting generally rectangular gasket blanks into closures which comprises intermittently advancing a strip of gasket material of predetermined width and thickness a distance equal to the gasket blank length in the direction of the strip toward a gasket insertion point and moving a previously cut end portion thereof over an aperture in an apertured plate, moving a closure from beneath the aperture in the plate and moving another closure beneath the aperture in the plate, cutting a line through said strip of gasket material at a point two or more gasket lengths from the end thereof during the periods between the intermittent advancement of the strip of gasket material, and pressing the entire previously cut end portion of the strip of gasket material through the plate aperture into the closure beneath by the advancing of the strip of gasket material.

3. The method of inserting generally rectangular gasket blanks into closures having their inner surface at least partially coated with a heat softenable adhesive which comprises intermittently advancing a strip of gasket material of predetermined width and thickness a given distance toward a gasket insertion point and moving a previously cut blank thereof over an aperture in an apertured plate, heating a closure, moving a closure under the aperture in the plate, cutting a gasket blank shape in the strip of gasket material by cutting a line across said strip two or more gasket blank widths from the end in the interval between the intermittent advancement of the gasket strip, pressing the entire previously cut gasket blank through the plate aperture into the closure therebelow each time that the strip of gasket material is advanced and pressing the gasket blank in the closure against the heat softened adhesive.

References Cited in the file of this patent

UNITED STATES PATENTS

| Number | Name | Date |
|---|---|---|
| 2,090,404 | Parkhurst | Aug. 17, 1937 |
| 2,168,409 | Johnson | Aug. 8, 1939 |
| 2,230,189 | Ferngren | Jan. 28, 1941 |
| 2,263,693 | Gavin et al. | Nov. 25, 1941 |
| 2,459,721 | Poltorak | Jan. 18, 1949 |
| 2,522,577 | Johnson | Sept. 19, 1950 |
| 2,567,141 | Andrew et al. | Sept. 4, 1951 |
| 2,598,028 | Andrew et al. | May 27, 1952 |
| 2,719,564 | Schneider | Oct. 4, 1955 |
| 2,720,679 | Ratliff | Oct. 18, 1955 |
| 2,743,753 | Graves et al. | May 1, 1956 |
| 2,772,012 | Crabtree | Nov. 27, 1956 |